United States Patent
Lingam et al.

(10) Patent No.: US 9,935,681 B2
(45) Date of Patent: Apr. 3, 2018

(54) PREAMBLE SEQUENCE DETECTION OF DIRECT SEQUENCE SPREAD SPECTRUM (DSSS) SIGNALS

(71) Applicant: Texas Instruments Incorporated, Dallas, TX (US)

(72) Inventors: Srinivas Lingam, Dallas, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/071,998

(22) Filed: Mar. 16, 2016

(65) Prior Publication Data

US 2017/0272118 A1    Sep. 21, 2017

(51) Int. Cl.
 *H04B 1/00*  (2006.01)
 *H04B 1/7097* (2011.01)
 *H04B 1/709*  (2011.01)

(52) U.S. Cl.
 CPC .......... *H04B 1/7097* (2013.01); *H04B 1/709* (2013.01)

(58) Field of Classification Search
 CPC ...... H04B 1/707; H04B 1/709; H04B 1/7093; H04B 1/7095; H04B 1/70775; H04B 17/336; H04B 1/69; H04B 7/2628; H04B 17/318; H04B 1/109; H04B 2201/70722; H04B 2201/70727; H04B 7/0811; H04B 7/216; H04B 1/70752; H04L 27/2647; H04L 7/007; H04W 40/12; H04W 52/241; H04W 52/0229; H04J 13/00
 USPC ....... 375/147, 343, 150, 142, 152, 143, 434, 375/340, 137, E1.002, E1.032, E1.001
See application file for complete search history.

(56) References Cited

U.S. PATENT DOCUMENTS

| | | | |
|---|---|---|---|
| 9,231,648 B2 | 1/2016 | Lingam | |
| 2008/0205492 A1* | 8/2008 | Gorday | H04B 1/707 375/150 |
| 2010/0027718 A1* | 2/2010 | Vaidyanathan | H04L 27/2647 375/340 |
| 2011/0255571 A1* | 10/2011 | Caffrey | H04B 1/707 375/141 |
| 2013/0202014 A1 | 8/2013 | Schmidl | |
| 2016/0270058 A1* | 9/2016 | Furuskog | H04L 1/0006 |

* cited by examiner

*Primary Examiner* — Rahel Guarino
(74) *Attorney, Agent, or Firm* — Kenneth Liu; Charles A. Brill; Frank D. Cimino

(57) ABSTRACT

A direct sequence spread spectrum (DSSS) receiver includes an antenna, signal-to-noise ratio (SNR) estimation logic, and preamble detection logic. The antenna is configured to receive a DSSS signal. The SNR estimation logic is configured to estimate SNR of the received DSSS signal. The preamble detection logic is configured to, in response to the SNR estimate exceeding a SNR threshold value, detect a preamble sequence in the DSSS signal based on an absolute value of a sequence of correlation values. The sequence of correlation values is a complex quantity.

7 Claims, 4 Drawing Sheets

PREAMBLE SEQUENCE DETECTION OF DIRECT SEQUENCE SPREAD SPECTRUM (DSSS) SIGNALS

BACKGROUND

Direct sequence spread spectrum (DSSS) networks are used in implementing over the air systems. In one example, a smart utility network (SUN) is a low rate (5 kb/s to 1 Mb/s), low power, wireless communications technology that is specifically designed to be used in utility metering applications, such as for transmitting electric, gas, or water usage data from the one or more meters on the customer premises to a data collection point operated for the utility. The data collection point can then be connected to a central office for the utility by a similar or a different interface, which can be a high speed "backhaul" such as an optical fiber, copper wire, or other high speed wired connection to a network including the central office.

Different physical layers (PHYs) can be used for communication in over the air networks such as a SUN, including frequency shift keying (FSK), DSSS, and orthogonal frequency division multiplexing (OFDM). In an example, the devices that are allowed into the network of a closed DSSS communications system can be controlled by the utility or the network operator. Note that while some of the examples discussed herein for illustration include the operation of smart utility networks, the arrangements disclosed as aspects of the present application are not so limited and can be applied and used in conjunction with DSSS communications networks, generally.

A relevant standard has been promulgated by the IEEE, referred to as IEEE standard number 802.15.4g, entitled "Low-Rate Wireless Personal Area Networks (LR-WPANs)" issued Apr. 27, 2012 by the IEEE Computer Society and sponsored by the LAN/MAN Standards Committee. This standard identifies the PHY specifications for low data rate, wireless, SUN. The standard is intended to provide a globally used standard that facilitates very large scale process control applications such as a utility smart-grid network that are capable of supporting large, geographically diverse networks with minimal infrastructure and containing potentially millions of fixed endpoints. Note that arrangements of the present application is not limited to particular environment, including the SUN applications, but the various arrangements that form aspects of the present application are applicable to such applications.

In DSSS communications, data is transmitted utilizing packets. In packetized communication systems, packet arrival instants are generally random and unknown at the receiver. The payload can be successfully demodulated provided the receiver has symbol timing, frequency and phase offset information, in addition to achieving frame synchronization. In many practical applications, these parameters are not known a priori at the receiver and hence must be estimated from the received signal.

SUMMARY

The problems noted above are solved in large part by systems and methods for detecting a preamble sequence in a DSSS signal. In some embodiments, a DSSS receiver includes an antenna, signal-to-noise ratio (SNR) estimation logic, and preamble detection logic. The antenna is configured to receive a DSSS signal. The SNR estimation logic is configured to estimate SNR of the received DSSS signal. The preamble detection logic is configured to, in response to the SNR estimate exceeding a SNR threshold value, detect a preamble sequence in the DSSS signal based on an absolute value of a sequence of correlation values. The sequence of correlation values is a complex quantity.

Another illustrative embodiment is a method for detecting a preamble sequence in a DSSS signal. The method may include receiving a DSSS signal and generating a digital sequence of samples representative of the DSSS signal. The method may also include calculating differential chip values between pairs of samples of the sequence of samples to form a sequence of differential values. The method may also include correlating a known preamble differential value sequence with the sequence of differential values to form a sequence of correlation values. The method may also include estimating a SNR of the received DSSS signal and comparing the estimated SNR to a SNR threshold value. The method may also include, in response to the estimated SNR being less than the SNR threshold value, comparing an imaginary value of the sequence of correlation values with a preamble threshold to detect a location of the preamble in the digital sequence of samples.

Yet another illustrative embodiment is a DSSS communication system. The DSSS communication system may include a transmitter and a receiver. The transmitter is configured to transmit a DSSS signal that includes a preamble sequence to a receiver. The receiver is configured to receive the DSSS signal and generate a digital sequence of samples representative of the DSSS signal. The receiver is also configured to calculate differential chip values between pairs of samples of the sequence of samples to form a sequence of differential values. The receiver is also configured to correlate a known preamble differential value sequence with the sequence of differential values to form a sequence of correlation values. The receiver is also configured to estimate a SNR of the received DSSS signal. In response to the estimated SNR exceeding the SNR threshold value, the receiver is configured to compare an absolute value of the sequence of correlation values with a preamble threshold to detect a location of the preamble in the digital sequence of samples. In response to the estimated SNR being less than the SNR threshold value, the receiver is configured to compare an imaginary value of the sequence of correlation values with a preamble threshold to detect a location of the preamble in the digital sequence of samples.

BRIEF DESCRIPTION OF THE DRAWINGS

For a detailed description of various examples, reference will now be made to the accompanying drawings in which.

NOTATION AND NOMENCLATURE

Figure 1:
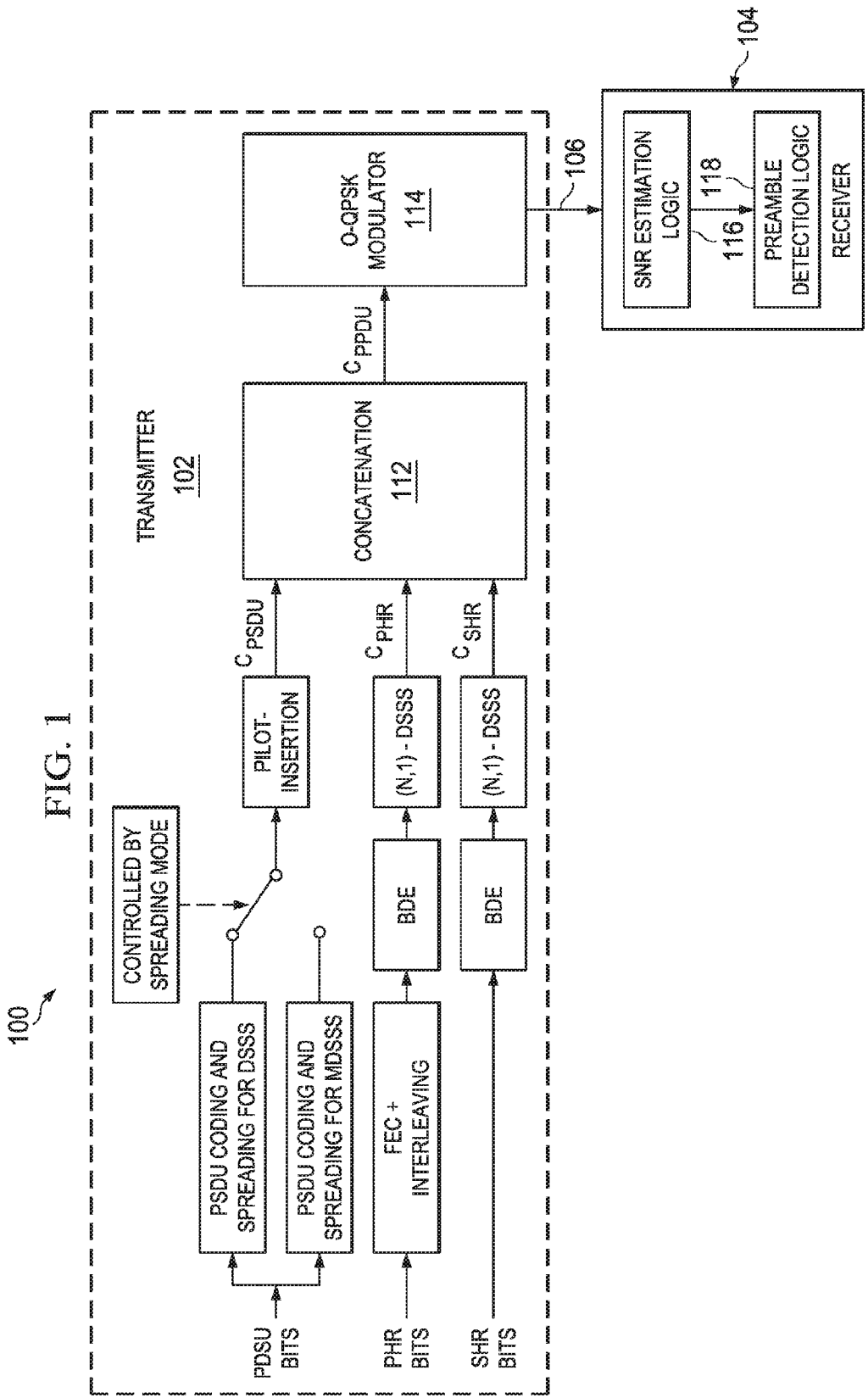
FIG. 1 shows an illustrative block diagram of a DSSS communication system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In many DSSS communication systems, such as in a SUN, synchronization between the transmitter and the receiver may be affected by the SNR of the transmitted signal. More specifically, DSSS utilizes a standard wireless protocol for data packets (i.e., the packet format for the physical layer) including a synchronization header (SHR), which includes a preamble and start frame delimiter (SFD), a physical layer header (PHR), and a physical layer service data unit (PSDU). It is important that the receiver be able to readily synchronize with the transmitter by detecting the preamble in the transmitted data packets otherwise the packet error rate of packets will increase. In conventional systems, the packet error rate decreases as SNR increases. However, in the conventional system, a packet error floor is reached, whereby even with increases in SNR, packet errors remain at a certain level (e.g., one in every 100 packets are dropped no matter how high the SNR).

In accordance with the disclosed principles, a DSSS communication system includes hardware and/or software that switches between two synchronization algorithms based on the SNR of the received signal such that there is no packet error floor. In accordance with the disclosed principles, the SNR of the received signal is estimated. Metrics for chip timing are calculated. More particularly, the differential chip values between chips of the signal are correlated to form a sequence of correlation values. This sequence is a complex value. If the estimated SNR exceeds a SNR threshold value, the preamble sequence of the received signal is detected based on the absolute value of the sequence of correlation values. However, if the estimated SNR is less than the SNR threshold value, the preamble sequence of the received signal is detected based on the imaginary value of the sequence of correlation values. Basing the synchronization algorithm on the SNR of the received signal leads to better synchronization than in the conventional system. Therefore better packet error performance may be achieved. In fact, the packet error floor that is inherent in conventional systems is removed entirely.

FIG. 1 shows an illustrative block diagram of a DSSS communication system 100 in accordance with various embodiments. DSSS communication system 100 may include transmitter 102 and receiver 104. In some embodiments, the transmitter 102 is implemented in a smart meter of a SUN. For example, transmitter 102 may be configured to transmit energy usage data from the smart meter to receiver 104. Transmitted data, which may include a synchronization header (SHR), which includes a preamble and start frame delimiter (SFD), a physical layer header (PHR), and a physical layer service data unit (PSDU), is coded, spread and concatenated by concatenation logic 112 before being coupled to offset quadrature phase shift key (O-QPSK) modulator 114. The O-QPSK modulator 114 modulates the concatenated data. O-QPSK modulator 114 may utilize phase shift keying (PSK) to modulate the data. In PSK, digital modulation is used to transmit data by modulating the phase of a reference signal or carrier. More particularly, O-QPSK modulator 114 utilizes quadrature phase shift keying (QPSK) in which four points on a constellation diagram are used to provide four phases of the output DSSS signal 106. Accordingly, two bits may be used to indicate the quadrature phase. Because the O-QPSK modulator 114 utilizes O-QPSK, two portions, the in-phase and quadrature components or I and Q components of a symbol, are transmitted with an offset between them. In this manner, only one bit of a two bit coding scheme changes at a given time. Thus, reception errors that may occur in the reception, by receiver 104, of the symbols due to noise or interference are reduced.

Receiver 104 is configured to receive the modulated DSSS signal 106 from the transmitter 102. Receiver 104 may include SNR estimation logic 116 and preamble detection logic 118. SNR estimation logic 116 may be any combination of hardware and/or software that is configured to estimate the SNR in the DSSS signal 106 utilizing any SNR estimation method and/or algorithm. For example, the SNR estimators may be based on receiver statistics directly related to SNR or receiver statistics inversely related to the SNR. The preamble detection logic 118, which may be any combination of hardware and/or software, is configured to detect a preamble sequence in the DSSS signal 106 based, at least in part on, the estimated SNR.

Figure 2:
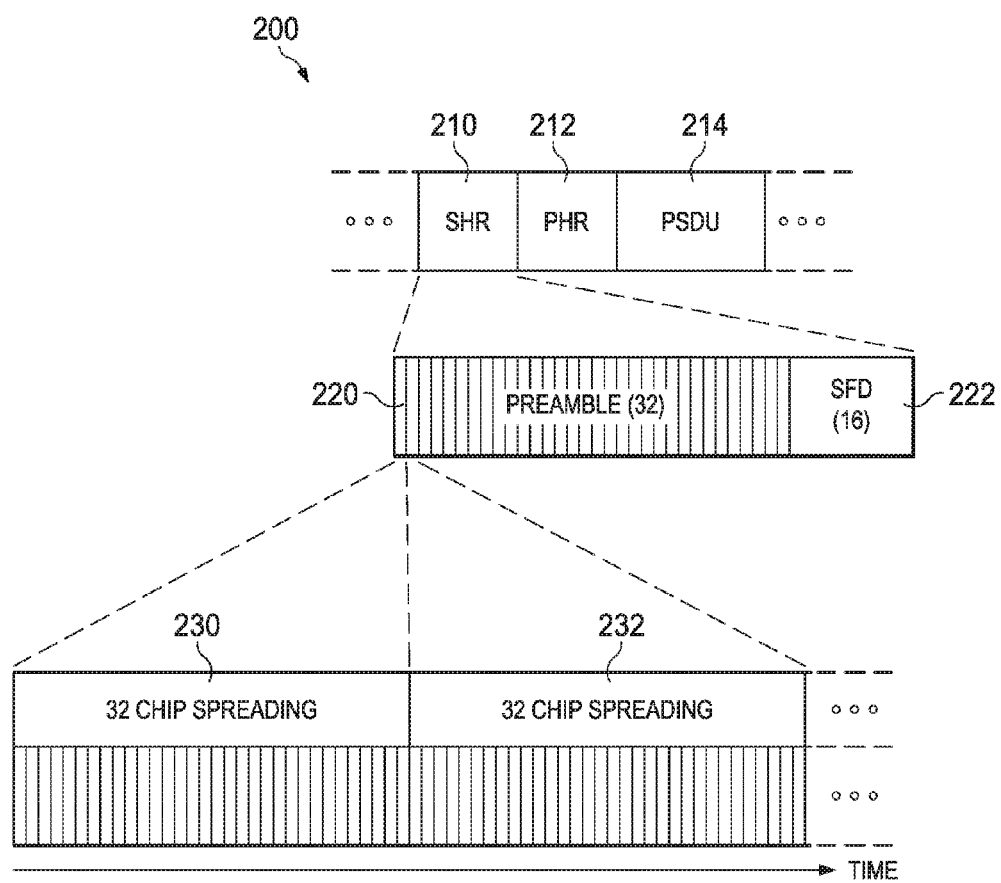
FIG. 2 shows an illustrative block diagram of a packet header for a DSSS packet in accordance with various embodiments.

FIG. 2 shows an illustrative block diagram of a packet header for a DSSS packet 200 which may be carried in DSSS signal 106 in accordance with various embodiments. In a DSSS communication system, a "chip" refers to a single electrical pulse with duration equal to 1/chip second rate. For example, in a 100 k/chip rate system, the chip duration would be 1/100,000=10 uS. The DSSS packet 200 that is carried in DSSS signal 106 includes fields such as a synchronization header (SHR) 210, physical layer header (PHR) 212, and a physical layer service data unit (PSDU) 214. Each SHR contains a preamble 220 and a start frame delimiter (SFD) 222 that can be utilized by receiver 104 from FIG. 1 for detecting the DSSS packet. For the 100 kchip/s mode, the preamble 220 contains 32 bits that are spread with a spreading code of 32 to form a string of 1024 chips (32 bits×32 spread) as indicated in 230-232. The SFD 222 contains 16 bits that are also spread with a spreading code of 32. As previously mentioned, the receiver 104 is configured, utilizing preamble detection logic 118, to detect the preamble 220 based, at least in part on, the estimated SNR of the DSSS signal 106.

Figure 3:
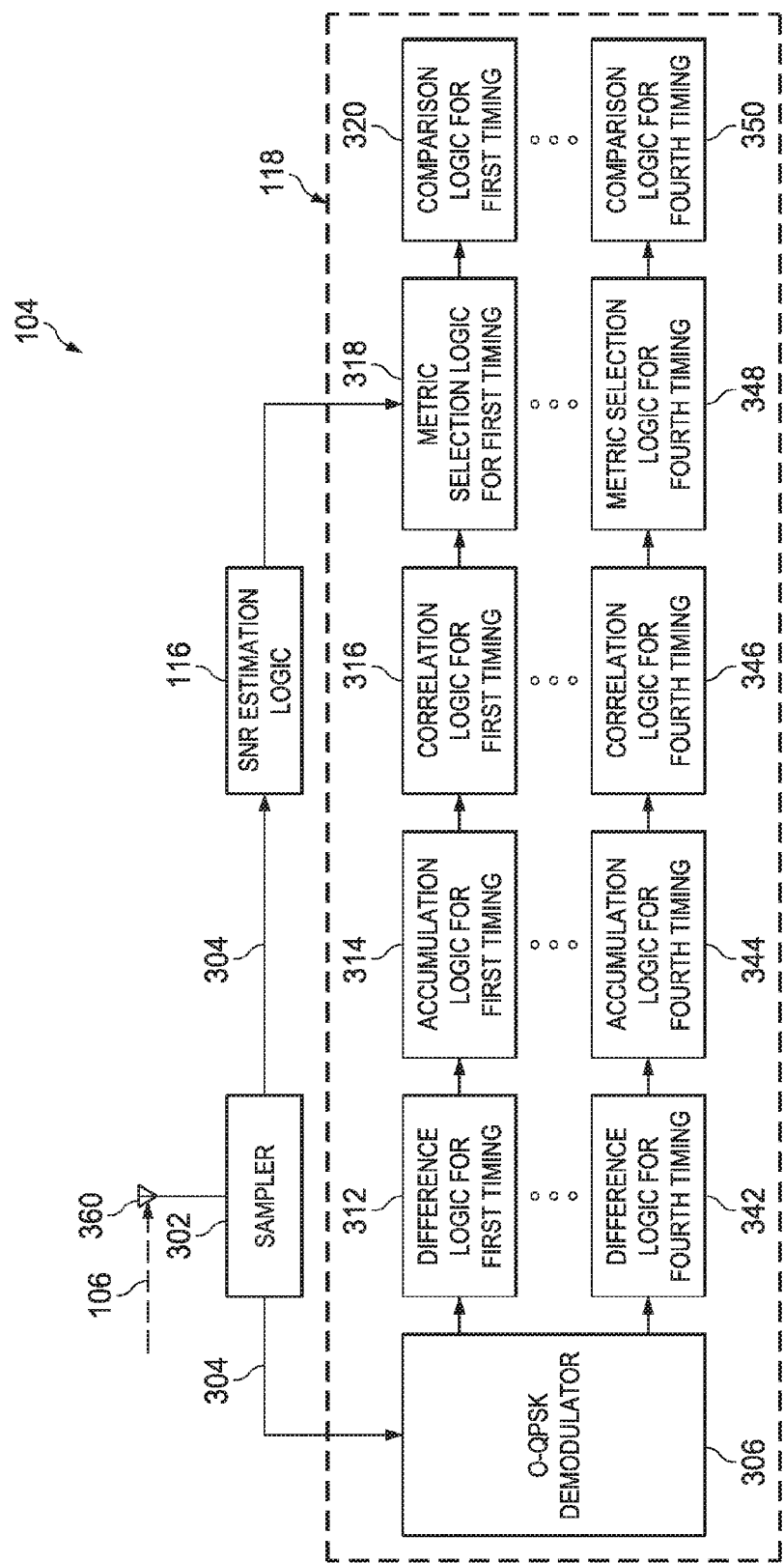
FIG. 3 shows an illustrative block diagram of a DSSS receiver in accordance with various embodiments.

FIG. 3 shows an illustrative block diagram of DSSS receiver 104 in accordance with various embodiments. In addition to SNR estimation logic 116 and preamble detection logic 118, receiver 104 may also include antenna 360 and sampler 302. Antenna 360 is configured to receive the DSSS signal 106 from a communications channel (e.g., an over-the-air channel). Sampler 302 is configured to receive the DSSS signal 106 from antenna 360 and sample and/or generate a digital sequence of samples 304 representative of the DSSS signal 106. In some embodiments, sampler 302 samples the DSSS signal 106 at 4× the chip rate. In other embodiments, sampler 302 samples the DSSS signal 106 at 2× the chip rate while in further embodiments, sampler 302 samples the DSSS signal 106 1× the chip rate. In yet further examples, sampler 302 may sample the DSSS signal 106 at any rate. Since the samples represent a complex value for the I and Q portion, they have the form (I+jQ). This produces four timing phases which can be termed $timing_1$, $timing_2$, $timing_3$, and $timing_4$. The symbol timing for $timing_2$ is delayed by one sample with respect to the symbol timing for $timing_1$, for example.

Preamble detection logic 118 then may receive the sequence of samples 304. In some embodiments, preamble detection logic 118 comprises O-QPSK demodulator 306, difference logic 312,342, accumulation logic 314, 344, correlation logic 316, 346, metric selection logic 318, 348, and comparison logic 320, 350. For each timing phase, O-QPSK demodulator 306 is configured to demodulate the sequence of samples 304 generated by the sampler 302. In some embodiments, O-QPSK demodulator 306 demodulates the sequence of samples 304 by multiplying each of the received samples by the discrete value of a half-sine pulse shape. However, in alternative embodiments, O-QPSK demodulation may be performed using any demodulation technique. Due to the demodulation, the I,Q samples are down converted.

In FIG. 3, processing of phase $timing_1$ utilizing the logic in 312-320 and $timing_4$ utilizing the logic in 342-350 are illustrated, but the other two phases are treated in a similar manner. In some embodiments, only a single logic block for each logic block 312-320 may be utilized to process all of the phase timings. Difference logic 312, 342 is any hardware and/or software configured to calculate differential chip values between pairs of samples in the demodulated sequence of samples for each phase. Differential chip detection may be performed by multiplying the conjugate of the previous chip estimate by the current chip estimate. Quantization to one bit for I and one bit for Q may be done to lower computational complexity and to minimize the effect of automatic gain control (AGC) gain changes in the preamble. A complex conjugate is formed by negating the imaginary part of the complex number. Complex conjugate multiplication may be used to form the differential sequence of chip values in order to focus on the phase difference between the adjacent pairs of I,Q samples. In other embodiments, difference logic 312, 342 may multiply the conjugate of the previous symbol to calculate the differential chip values prior to O-QPSK demodulation. In this embodiment, O-QPSK demodulation of the preamble portion of the packet does not need to be performed.

Accumulation logic 314, 344 is any hardware and/or software configured to accumulate the differential chip values to form a sequence of differential values. For each of the four timing phases, for example, accumulation logic 314, 344 may accumulate the differential chip values over 24 preamble words in groups of 8 words. When 8 new words are accumulated the oldest 8 words may be discarded. In some embodiments, accumulation logic 314, 344 stores two groups of differential chip values, each group containing 32 differential chip values with each value being the sum of eight chip estimates. In alternative embodiments, accumulation logic 314, 344 may accumulate any number of preamble words in any number of groups.

Correlation logic 316, 346 is any hardware and/or software configured to correlate the sequence of differential values accumulated by accumulation logic 314, 344 with a known preamble differential value sequence to form a sequence of correlation values. In other words, correlation logic 316, 346 may correlate the samples accumulated in accumulation logic 314, 344 with a known chip spreading value. The correlation logic 316, 346 may perform this correlation in either the time domain or the frequency domain. If correlation is performed in the frequency domain, a complex fast Fourier transform (FFT) may be performed on the accumulated sequence of differential values. For example, a complex FFT of length 32 of the current block of differential values stored in the accumulation logic 314, 344 may be taken. Correlation logic 316, 346 then may multiply the result of the FFT with an FFT of the known transmitted differential chip sequence (e.g., perform 32 complex multiplies with a stored FFT of the known differential chip sequence). A complex inverse FFT (IFFT) may be performed by the correlation logic 316, 346 on the result of the multiplication (e.g., taking a complex IFFT of length 32) to produce the sequence of correlation values. If the correlation is performed in the time domain, a convolution of the known preamble differential chip sequence with the sequence of differential chip values may be performed (i.e., integrating the product of the two functions after one is reversed and shifted). Due to the complex nature of the I, Q samples, each of the correlation values in the sequence of correlation values is also a complex value that comprises a real value and an imaginary value. Furthermore, the absolute value of each of the correlation values may be determined by correlation logic 316 (e.g., calculate the absolute value of each of the complex correlation values).

Metric selection logic 318, 348 is any hardware and/or software configured to compare the SNR estimate to a SNR threshold value. The SNR estimate generated by the SNR estimation logic 116 is received by the metric selection logic 318, 348. The metric selection logic 318, 348 may compare this SNR estimate with a SNR threshold value. The SNR threshold value may be a value which is, in some embodiments, programmed into the metric selection logic 318, 348 prior to receiver 104 receiving DSSS signal 106. In some embodiments, the SNR threshold value is based on simulations to provide the lowest packet error rate and, in some embodiments, may be 10 dB. The metric selection logic 218, 348, which receives the sequence of correlation values, including the absolute value and imaginary value from the correlation logic 316, 346, may then select either the absolute value of the sequence of correlation values or the imaginary value of the sequence of correlation values to be provided to comparison logic 320, 350. If the metric selection logic 218, 248 determines that the SNR estimate exceeds the SNR threshold value, metric selection logic 318, 348 provides the absolute value of the sequence of correlation values to comparison logic 320, 350. However, if the metric selection logic 218, 248 determines that the SNR estimate is less than the SNR threshold value, metric selection logic 318, 348 provides the imaginary value of the sequence of correlation values to comparison logic 320, 350.

Comparison logic 320, 350 is any hardware and/or software configured to detect the preamble sequence in the digital sequence of samples 304. In an embodiment, comparison logic 320, 350 compares the received absolute value of the sequence of correlation values, based on the SNR estimate exceeding the SNR threshold value, or the received imaginary value of the sequence of correlation values, based on the SNR estimate being less than the SNR threshold value, to a preamble threshold value. When the preamble threshold is exceeded, the preamble location has been detected. More specifically, the comparison logic 320,350 may be configured to detect the preamble sequence by comparing the peak of either the absolute value of the sequence of correlation values or the imaginary value of the sequence of correlation values (depending on whether the SNR estimate exceeds or is less than the SNR threshold as discussed above) to the preamble threshold value. This indicates the detection of the preamble sequence. For example, if the sequence of correlation values has a length of 32, the comparison logic 320, 350 may compare all 32 values of either the absolute value of each correlation value or the imaginary value of each correlation value (depending on whether the SNR estimate exceeds or is less than the SNR threshold as discussed above) to determine the peak (i.e., largest value) which is the location of the preamble sequence. In alternative embodiments, each of either the absolute value of each correlation value or the imaginary value of each correlation value (depending on whether the SNR estimate exceeds or is less than the SNR threshold as discussed above) is compared to the preamble threshold and, if the preamble threshold is exceeded, the location of the preamble sequence is determined.

Figure 4:
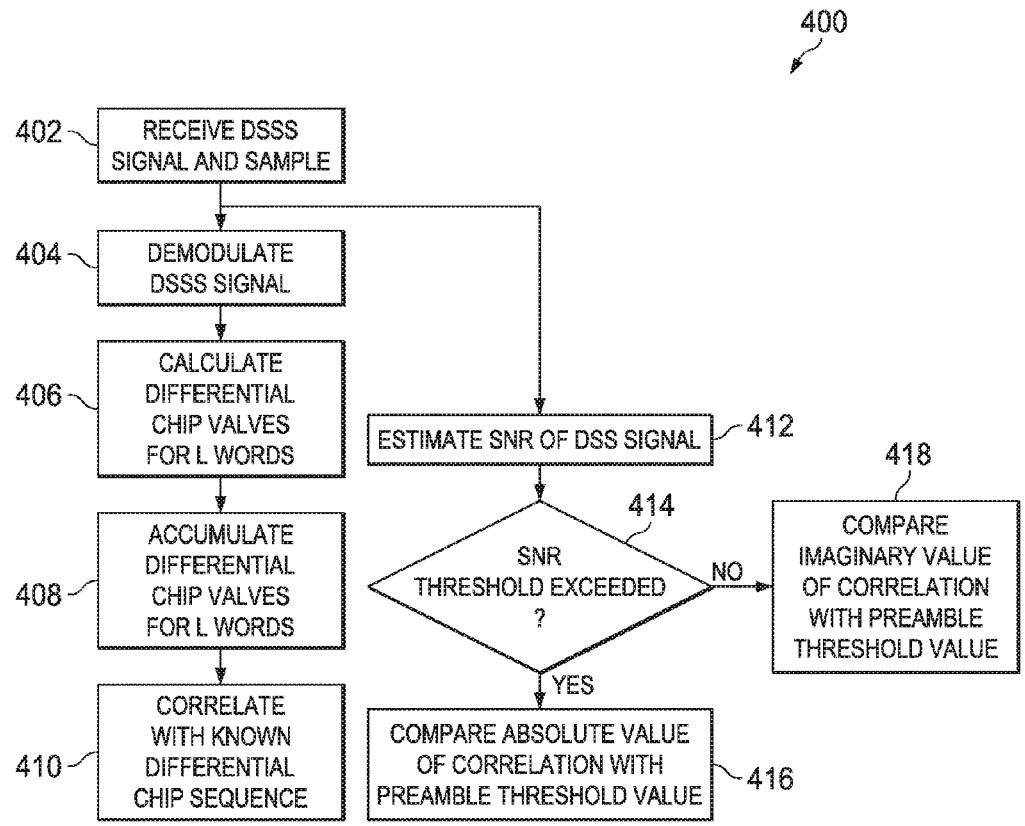
FIG. 4 shows an illustrative flow diagram of a method for detecting a preamble sequence in a DSSS signal.
Figure 5:
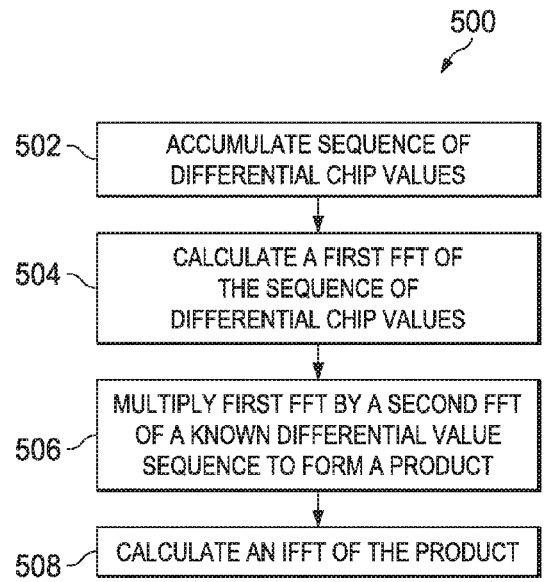
FIG. 5 shows an illustrative flow diagram of a method for correlating a known preamble differential value sequence with calculated sequence of differential values from a DSSS signal in accordance with various embodiments.

FIG. 4 shows an illustrative flow diagram of a method 400 for detecting a preamble sequence in a DSSS signal. FIG. 5 shows an illustrative flow diagram of a method 500 for correlating a known preamble differential value sequence with calculated sequence of differential values from a DSSS signal in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the methods 400 and 500, as well as other operations described herein, can be performed by receiver 104 and implemented by a processor executing instructions stored in a non-transitory computer readable storage medium.

The method 400 begins in block 402 with receiving and sampling a DSSS signal, such as DSSS signal 106, to generate a digital sequence of samples. In some embodiments, the DSSS signal is received by an antenna, such as antenna 360 and sampled by a sampler, such as sampler 302. In block 404, the method 400 continues with demodulating the DSSS signal, and more particularly, with demodulating, in some embodiments utilizing O-QPSK demodulator 306, the digital sequence of samples.

The method 400 continues in block 406 with calculating, in some embodiments utilizing difference logic 312, 342, differential chip values. For example, differential chip detection may be performed by multiplying the conjugate of the previous chip estimate by the current chip estimate. In block 408, the method 400 continues with accumulating the differential chip values for L number of words. For example, accumulation logic 314, 344 may accumulate and/or store the differential chip values over 24 preamble words in groups of 8 words. The method 400 continues in block 410 with correlating, in some embodiments utilizing correlation logic 316, 346, the accumulated sequence of differential chip values with a known preamble differential value sequence to form a sequence of correlation values.

In block 412, the method continues with estimating the SNR of the received DSSS signal. For example as the DSSS signal is received, the SNR estimation logic 116 may estimate the SNR of the DSSS signal. The method 400 continues in block 414 with determining, in some embodiments utilizing metric selection logic 318, 348, whether the estimated SNR exceeds a SNR threshold value. If, in block 414, the estimated SNR does exceed the SNR threshold value, then the method 400 continues in block 416 with comparing the absolute value of the sequence of correlation values with a preamble threshold value to detect the preamble sequence in the received DSSS signal. In some embodiments, the comparison logic 320, 350 receives the sequence of correlation values and the absolute value of the sequence of correlation values. The comparison logic 320, 350 may detect the preamble sequence by comparing the peak of the absolute value of the sequence of correlation values to the preamble threshold value. However, if, in block 414, the estimated SNR does not exceed the SNR threshold value, then the method 400 continues in block 418 with comparing the imaginary value of the sequence of correlation values with the preamble threshold value to detect the preamble sequence in the received DSSS signal. In some embodiments, the comparison logic 320, 350 receives the sequence of correlation values and the imaginary value of the sequence of correlation values. The comparison logic 320, 350 may detect the preamble sequence by comparing the peak of the imaginary value of the sequence of correlation values to the preamble threshold value.

FIG. 5 shows an illustrative flow diagram of a method 500 for correlating a known preamble differential value sequence with calculated sequence of differential values from a DSSS signal in accordance with various embodiments. The method 500 begins in block 502 with accumulating an extended sequence of differential chip values. The extended sequence of differential chip values may be accumulated, in some embodiments, by accumulation logic 314, 344. In block 504, the method 500 continues with calculating, in some embodiments utilizing correlation logic 316, 346, a first complex FFT of the extended sequence of differential chip values. The method 500 continues in block 506 with multiplying, in some embodiments utilizing correlation logic 316, 346, the first complex FFT by a second complex FFT to form a product. The second complex FFT is a complex FFT of a known differential value sequence. In block 508, the method 500 continues with calculating, in some embodiments utilizing correlation logic 316, 346, an IFFT of the product to produce the sequence of correlation values.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A direct sequence spread spectrum (DSSS) receiver, comprising:
   an antenna wherein the antenna receives a DSSS signal;
   signal-to-noise ratio (SNR) estimation logic wherein the SNR estimation logic is coupled to the antenna;
   preamble detection logic coupled to the SNR estimation logic; and
   a sampler coupled to the antenna, SNR estimation logic, and preamble detection logic;
   wherein the preamble detection logic comprises:
   difference logic;
   accumulation logic coupled to the difference logic; and
   correlation logic coupled to the accumulation logic;

wherein the correlation logic further comprises a offset quadrature phase shift keying (0-QPSK) demodulator.

2. A method of detecting a preamble sequence in a direct sequence spread spectrum (DSSS) signal comprising:
receiving a DSSS signal;
generating a digital sequence of samples representative of the DSSS signal;
calculating differential chip values between pairs of samples of the digital sequence of samples to form a sequence of differential values;
correlating a known preamble differential value sequence with the sequence of differential values to form a sequence of correlation values;
estimating a signal-to-noise ratio (SNR) of the received DSSS signal;
comparing the estimated SNR to a SNR threshold value; and
in response to the estimated SNR being less than the SNR threshold value, comparing an imaginary value of the sequence of correlation values with a preamble threshold to detect a location of the preamble in the digital sequence of samples.

3. The method of claim 2, wherein, in response to the estimated SNR being less than the SNR threshold value, the detecting the location of the preamble sequence in the digital sequence of samples comprises identifying a peak in the imaginary value of the sequence of correlation values exceeding the preamble threshold.

4. The method of claim 2, wherein, in response to the estimated SNR exceeding the SNR threshold value, comparing an absolute value of the sequence of correlation values with the preamble threshold to detect the location of the preamble in the digital sequence of samples.

5. The method of claim 4, wherein, in response to the estimated SNR exceeding the SNR threshold value, the detecting the location of the preamble sequence in the digital sequence of samples comprises identifying a peak in the absolute value of the sequence of correlation values exceeding the preamble threshold.

6. The method of claim 2, wherein the correlating the known preamble differential value sequence with the sequence of differential values comprises:
accumulating an extended sequence of differential chip values;
calculating a first complex fast Fourier transform (FFT) of the extended sequence of differential chip values;
multiplying the first complex FFT by a second complex FFT of the known preamble differential value sequence to form a product; and
calculating an inverse FFT (IFFT) of the product.

7. The method of claim 6, wherein the preamble sequence is 32 bits.

* * * * *